US008994223B2

(12) United States Patent     (10) Patent No.: US 8,994,223 B2
Richter et al.     (45) Date of Patent: Mar. 31, 2015

(54) SYSTEMS AND METHODS FOR SELF POWERED ELECTRONIC DEVICES

(75) Inventors: Wolfgang Richter, Starnberg (DE); Faranak Zadeh, Vancouver (CA)

(73) Assignee: R2Z Innovations Inc., Vancouver, British Columbia (CA)

( * ) Notice: Subject to any disclaimer, the term of this patent is extended or adjusted under 35 U.S.C. 154(b) by 761 days.

(21) Appl. No.: 13/240,607

(22) Filed: Sep. 22, 2011

(65) Prior Publication Data

US 2012/0112828 A1     May 10, 2012

Related U.S. Application Data

(60) Provisional application No. 61/411,247, filed on Nov. 8, 2010.

(51) Int. Cl.
| | |
|---|---|
| H01F 27/42 | (2006.01) |
| H01F 37/00 | (2006.01) |
| H01F 38/00 | (2006.01) |
| G05F 3/06 | (2006.01) |
| H02J 17/00 | (2006.01) |

(52) U.S. Cl.
CPC ..................................... *H02J 17/00* (2013.01)
USPC ........................... 307/104; 307/151; 327/564

(58) Field of Classification Search
None
See application file for complete search history.

(56) References Cited

U.S. PATENT DOCUMENTS 5,642,268 A * 6/1997 Pratt et al. ...................... 363/17

* cited by examiner

*Primary Examiner* — Jared Fureman
*Assistant Examiner* — Aqeel Bukhari

(57) ABSTRACT

Disclosed is a self-powering system for electronic circuits by detecting and converting the energy of electric field lines provided from the generator of device in the proximity of the electronic circuit. The harvesting of electric field energy by using means of capacitive coupling (contactless or (in-) direct contact) to field inducing power sources replaces or reduces the need of batteries e.g. for mobile devices, medical sensors, energy efficient circuits (e.g. stand-by) or (near field-) communication devices. A wide range of applications and technical solutions from smart labels, e-ink devices, shutter glasses, or electronic sensors up to electronic devices of any kind, can use the invention's means to power (integrated) circuits microcontrollers, light emitting items (LED) or any circuit where batteries or other power sources can be replaced by the innovation.

8 Claims, 4 Drawing Sheets

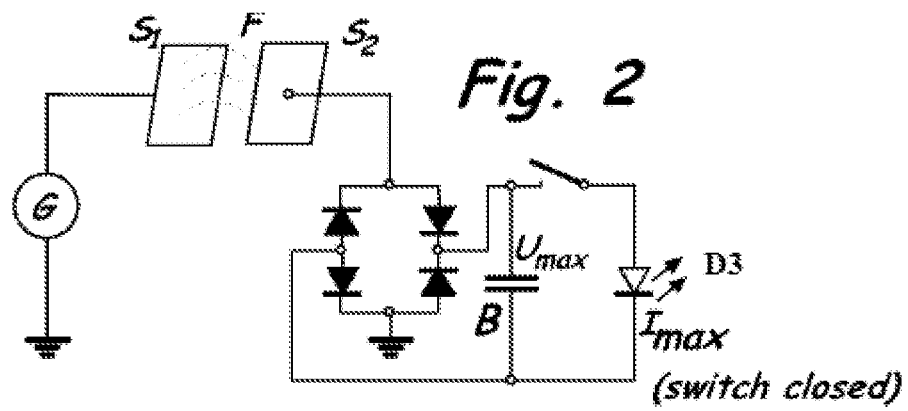
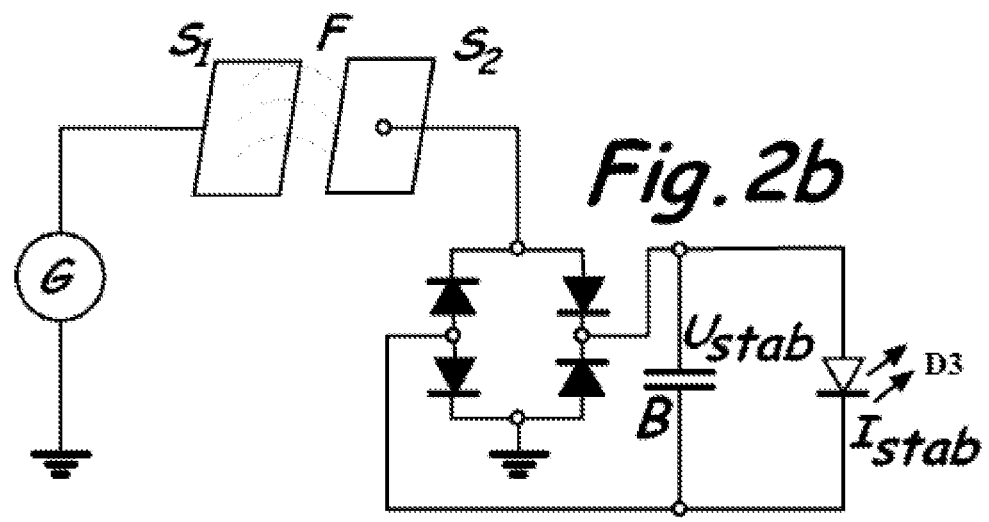

SYSTEMS AND METHODS FOR SELF POWERED ELECTRONIC DEVICES

CROSS REFERENCE TO RELATED APPLICATION

This application claims priority to US. Provisional Application No. 61/411,247 filed on Jun. 3, 2010, the entire contents of which are incorporated herein by references.

A portion of the disclosure of this patent document contains material which is subject to copyright or mask work protection. The copyright or mask work owner has no objection to the facsimile reproduction by anyone of the patent document or the patent disclosure, as it appears in the Patent and Trademark office patent file or records, but otherwise reserves all copyright or mask work rights whatsoever.

BACKGROUND OF THE INVENTION

1. Field of the Invention

The present invention generally relates to a system for powering up the electronic circuitry, more specifically the present invention relates to a system for self-power generating electronic circuitry

2. Description of Related Prior Art

Many electronic circuits or devices are equipped with batteries to operate them for at least a period. The operating time is depending how long a battery can provide electrical energy to a circuit. The art found ways to extend the life time of such devices by reducing the amount of the energy a circuit needs to operate (low-power, sleep modes, power managements, etc.). As integrated devices become smaller and smaller, batteries cannot shrink the same way and restrict the dimensions of the circuit. As batteries contain often toxic chemical elements, their recycling is very complex and pollutes the environment. Empty batteries can cause danger situations (e.g. if sensors do not operate properly). To save power, mentioned circuits often are equipped with a (mechanical) switch. Again, nowadays such switches are larger than the circuits used for being switched (on/off). Batteries also need battery holders or, if they are rechargeable, means and connectors to charge them.

It is well known that the energy can be transferred by use of (electro) magnetic means. So called transponders (or RFID's) are using coils or conductive windings provided by an external device (reader). The latter provides a lot of power where only a part of is received by a harvesting device. Also the shape or direction of the coils or antennas must match to the magnetic field line orientations. Energy harvesting is also known by using heat (peltier), vibration (piezo) or light. In direction of electric fields, scientists tried to use the energy of lightning to transfer into usable power. To provide piezo energy over long time needs continuous movement or vibration. A magnet moved near a coil can also induce power (generator principle). The art tells also about circuits with switch capacitors to generate (e.g.) negative voltages or shift it to different levels (cascades).

An electrical/electronic circuit can provide means itself to get energy "over the air" direct or contactless provided from (preferable alternating) electric field lines. Whenever such said device is in reach of said e-field it harvest the energy from the field and converts it into useable electrical power. Batteries or switches can be replaced with nano-sized electronic. Such a "Field Induced Power Source" (FIPS) can be integrated into silicon chips. A new kind of "energy state machine" and some charge buffers (e.g. capacitors) build the invention's "Self Power Engine" (SPE).

SUMMARY OF THE INVENTION

In accordance with the teachings of the present invention, a self-power engine system for on-demand power generation to energize the attached circuits is provided.

An object of the present invention is to provide a self-power engine system for on-demand power generation to energize the attached circuits. The self-power engine system receiving alternating electric energy from a generator through a first electrode.

Another object of the present invention is to provide the computing unit stores instructions to alter the functions and the output values of the self-power engine system.

Another object of the present invention is to provide one or more electrodes configured with the generator and self-power engine system. The coupling in between electrodes is selected either from over the air or conductive medium or non-conductive medium.

These and other objects, features and advantages of the invention will become more fully apparent in the following detailed description, taken in conjunction with the accompanying drawings.

BRIEF DESCRIPTION OF THE DRAWINGS

FIG. 2 illustrates a diagram of modification of the circuit with a switch, in accordance with a preferred embodiment of the present invention;

FIG. 2b illustrates diagram a modification of the circuit without the switch, in accordance with a preferred embodiment of the present invention;

Figure 1:
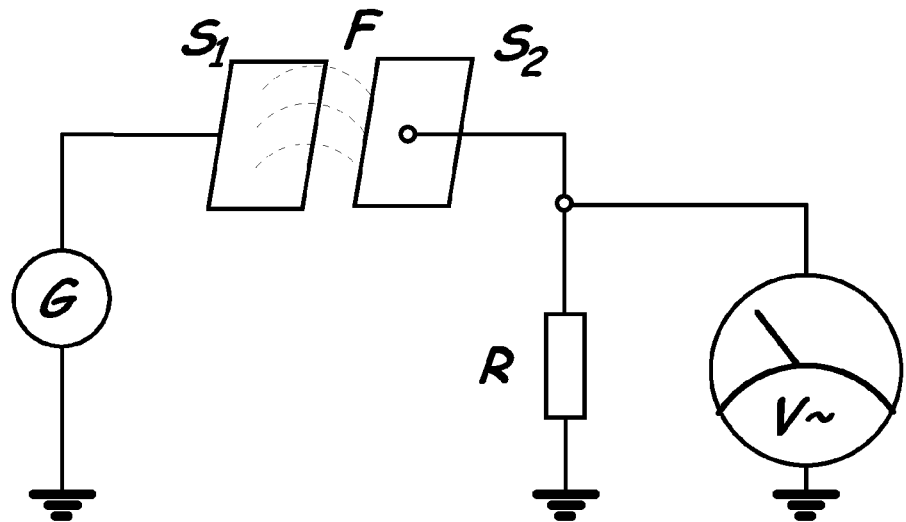
FIG. 1 illustrates a diagram of the self-power engine system for on-demand power generation to energize the attached circuits, in accordance with a preferred embodiment of the present invention.

The foregoing summary, as well as the following detailed description of certain embodiments of the present invention, will be better understood when read in conjunction with the appended drawings. For the purpose of illustrating the invention, certain embodiments are shown in the drawings. It should be understood, however, that the present invention is not limited to the arrangements and instrumentality shown in the attached drawings.

DETAILED DESCRIPTION OF DRAWINGS

While this technology is illustrated and described in a preferred embodiment, a self-power engine system for on-demand power generation to energize the attached circuits, receiving alternating electric energy from a generator through a first electrode may be produced in many different configurations, forms and materials. There is depicted in the drawings, and will herein be described in detail, as a preferred embodiment of the invention, with the understanding that the present invention is to be considered as an exemplification of the principles of the invention and the associated functional specifications for its construction and is not intended to limit the invention to the embodiment illustrated. Those skilled in the art will envision many other possible variations within the scope of the technology described herein.

FIG. 1 illustrates a diagram of the self-power engine system for on-demand power generation to energize the attached circuits. The self-power engine system receives alternating electric energy from a generator through a first electrode. The self-power engine system includes a second electrode coupled to the first electrode of the generator for receiving the alternating electric energy generated from the generator, at least one bridge rectifier to convert the received alternating electric energy to the direct electric field energy, one or more buffer to store the converted direct electric energy for energizing the attached electronic circuitry, one or more clock unit synchronized with the alternating electric energy received by the second electrode to provide the switching sequence by generating the clock signals, a state machine connected to the buffers to provide switching between the buffers either in series or in parallel and further the state machine received the switching sequences from the one or more clock unit and a computing unit connected to the state machine to compute the energy requirement of the attached circuits and further transmits the computed data to the state machine for energizing the attached circuits.

Figure 1B:
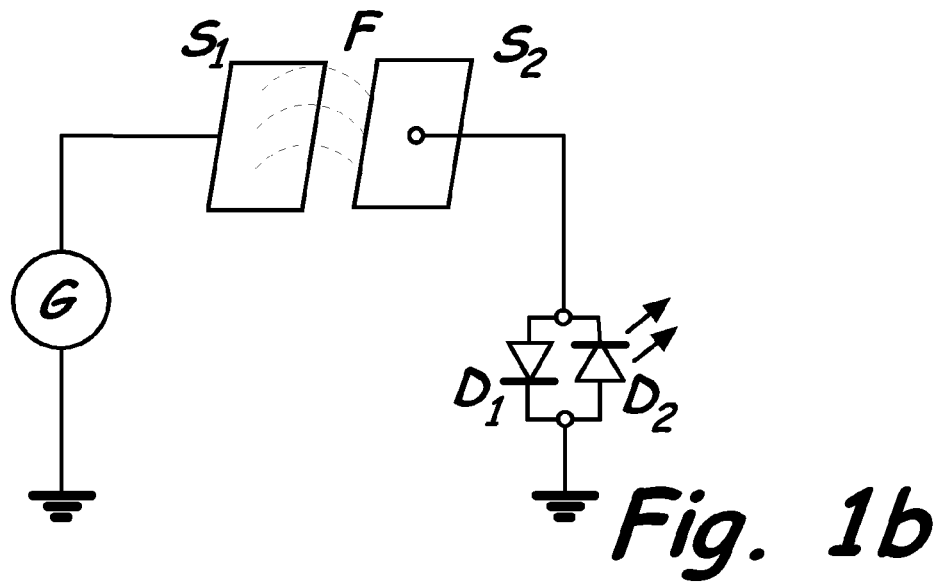
FIG. 1b illustrates diagram of a generator G generates an alternating electric field F which occurs on the surface 51 and further detected on light emitting diodes D1 and D2, in accordance with a preferred embodiment of the present invention.

In FIG. 1, a generator G generates an alternating electric field F which occurs on the surface S1. Another surface S2 in reach couples into this alternating field F so that both surfaces act like capacitor. An AC-voltage can be detected on resistor R against ground. In FIG. 1b the resistor is replaced with light emitting diodes D1, D2 in anti-parallel order. Each of them rectifies half a period of the AC voltage and protects the other one from overvoltage (surge) at the same time. As long as the generator G's voltage is higher than the diodes forward voltage, they will stabilize it and prevent from increasing over their own physical forward diffusion level. The more energy the generator G provides, depending on the generated AC voltage and the frequency of the electric field, the higher the LEDs will shine. The size of the coupling surface and the distance from each other is also of importance.

Figure 3:
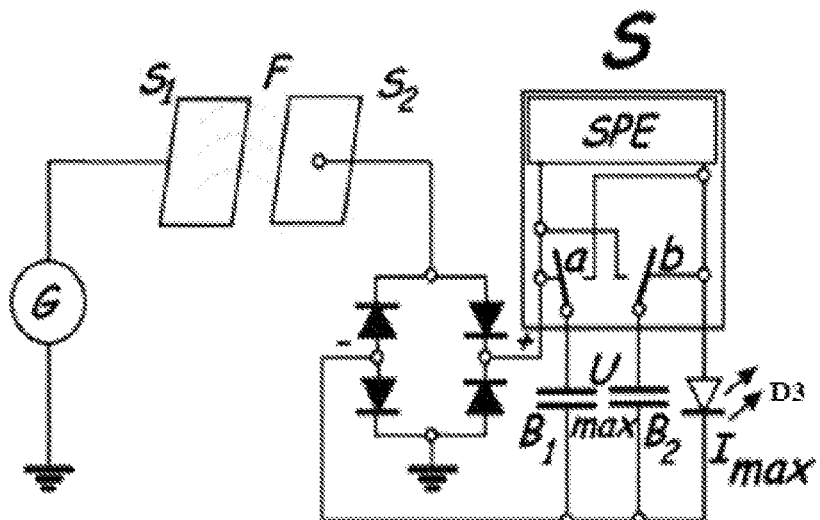
FIG. 3 illustrates a diagram of variation of two buffers are used, in accordance with a preferred embodiment of the present invention.

FIG. 2 further shows a modification of the circuit where a bridge rectifier (Greatz) converts AC to DC voltage and stores it in a buffer B. Over a switch an LED D3 can be powered with the buffer B's, energy. As the buffer will be discharged over D3, the latter will bright flash once. Further FIG. 2b shows the same circuit of FIG. 2 without a switch. D3 now continuously discharges the buffer B which is always getting new energy over the coupling surface S2. FIG. 3 shows a variation where two buffers, B1 and B2 are used. Always one of them is charged while the other one can be discharged. A kind of state machine S is attached to the circuit which provides the switching between B1 and B2. This can be done in various versions: A. A threshold level from B1 or B2 triggers the switching, (kind of flip-flop) B. An internal generated clock can provide the switching sequences C. The frequency of the e-field F can be triggered to provide the switching clock. D. Another external clock source can be used A First Self Power Engine (SPE)

Figure 4:
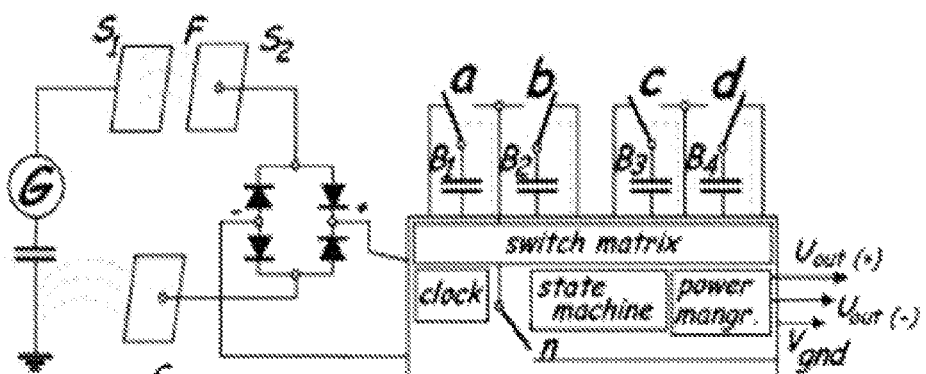
FIG. 4 illustrates a diagram of an arrangement of four buffers (B1, B2, B3, B4), in accordance with a preferred embodiment of the present invention.

FIG. 4 shows an arrangement of four buffers (B1, B2, B3, B4). Over the rectifier the alternating electric field F is received by the surfaces, S1 and S2. The surfaces also couple indirect to ground (electrodes). A state machine S controls the electronic switches a, b, c, d, e . . . n. The buffers B1 and B1 can be charged parallel or in series. On certain thresholds (e.g. if they are full with electrical energy) the state machine S switches to buffer B3 which gets either double voltage or double current (energy density). B4 is charged during the same or in another sequence. After a switching sequence B3 and/or B4 contain energy in a various level. The electronic switch n creates a virtual ground between B1 and B2 so that their voltage appears positive and negative against Vgnd. This is useful to power operational amplifiers (OP, INA, TIA) or other devices or items that need different polarized power. In this case e.g. B3 will contain the positive and B4 the negative voltage. The energy state-machine S's functions can be realized in hard and/or software. This is useful if the Self Power Engine SPE is integrated into e.g. a microcontroller, FPGA, ASIC or System-on-Chip (SOC) etc.

The Invention Related State Machine

Figure 5:
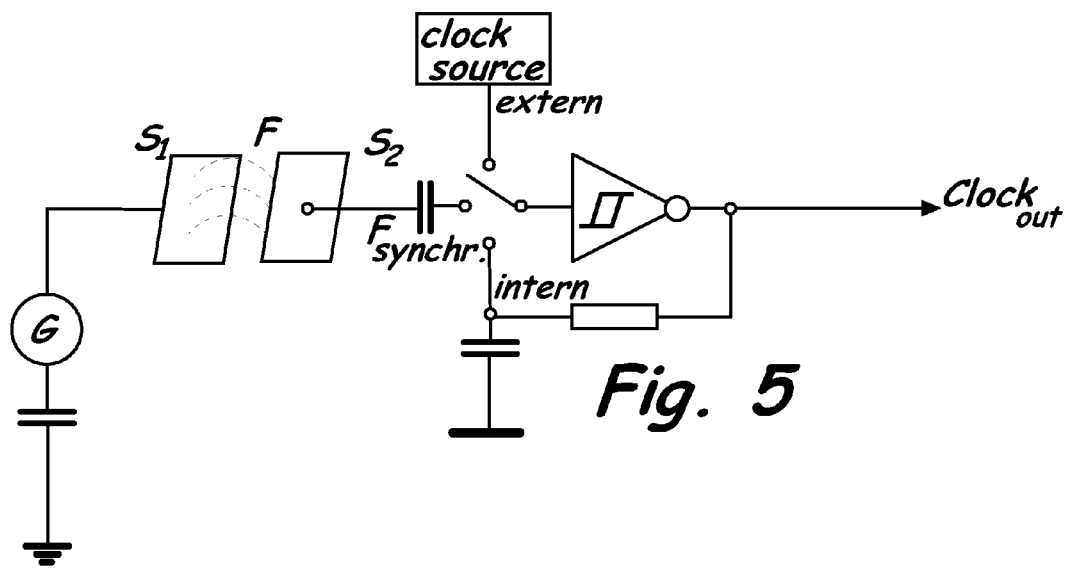
FIG. 5 illustrates a diagram of the clock unit to synchronize the SPE with the alternating electric field, in accordance with a preferred embodiment of the present invention.

The buffers (e.g. capacitors) B1, B2, B3, B4 can be charged or discharged in series or parallel mode, depending on the amount of electrical power needed by the attached circuits. Therefore the state machine S is a kind of smart controller with its own micro programs to perform. The states are steps for the processing means which can either switch electronic switches (e.g. FET's) or creating wait states or checking or acting on programmed thresholds. A Self Power Engine state machine (SPE) consists of a so-called switch matrix which can make alignments between the buffers. FIG. 5 illustrates a clock unit that works on a threshold's level (comparator) or switch it to external or internal clock generation (schmitt trigger).

It is also possible to clock the SPE synchronized with the alternating electric field. The generated clock can be splitted pre-scaled or divided. The electronic part which handles the states (state machine S) consist of a counter and a programmable look-up table (the counter can be also programmed). There is at least one look-up value for each stage. Such a value is a kind of bit pattern which can be direct or indirect lead to the electronic switches and/or effects the counter of the state machine, S (e.g. jumps). Also, threshold(s) comparison(s) can be done. The content of the look-up table can be changed during operation. If the Self Power Engine SPE is integrated into a micro-chip (e.g. microcontroller) the look up table can be a part of the controller's internal or external memory and can also be altered by the controller or other devices. Also, the complete Self Power Engine with state machine can be emulated by using the microcontroller's firmware (except the switch board). Said SPE can also have a hardware part (e.g. during start-up, boot) which can be overwritten by the microcontroller depending by its power needs. The SPE can also generate different voltages, e.g. for powering (instrumentation) amplifiers for sensing purposes.

A First the Invention Underlying Application

A system-on-chip (SoC) contains a microcontroller core (e.g. ARM, MIPS) peripherals (UART, SPI, CAN, USB, etc) and said Self Power Engine (SPE). For sensing purposes analogue parts like OPs, instrumentation AMPs, comparators, filters, etc., are implemented.

Said Chip can be attached to a patch which is also equipped with electrodes connected to the chip (e.g. printed or flexible electronic). This can be used as a kind of medical or biomedical sensor if attached to a human skin (dermis). If the user touches an electric field source or comes close to it, the electric field spreads out over the human body and can be detected and harvested by the chip's built-in SPE. This generates the power to operate the chip for its sensing or communication means.

Micro-Clouds

Alternating electric fields do not spread out far. This fact can be used to create the so-called "Micro-Clouds". Such clouds are the area around an e-field emitting electrode. If a self-powered device comes in reach of such a cloud, it starts working and is able to communicate with other devices over the clouds or with various kinds of communication means. For example, "Micro-Clouds" can be arranged in a vehicle or a factory or a house-hold or another area where electronic (sensing-) circuits are mobile used. The invention related Self Power Engine SPE is also able to charge a buffer from such a cloud and keep the attached electronic (or parts) running for a while, when this part leaves the e-field clouds.

Communicative Environment

Modulation of the electric field can be used for bi-directional data transfer. A, with the invention attached device can be charged with power or information from one cloud and transfers values or data into the next cloud. The invention provides means for so called "e-field communication".

Other Applications

The innovation's underlying Self Power Engine SPE can shine LEDs or power sensing or computing or communication devices. The power can be consumed internal or external by using the invention related power management unit. SPE's can also work in conjunction with other energy harvesting devices or units. SPEs can be cascaded for higher performance.

3D shutter glasses, hearing aids, electronic patches, E-Ink labels, (brain wave) head bands, electronic toys or games, token, pawns and action figures, as well as consumer- or other devices, watches can be powered with the innovation as well as electronic sensing devices or units.

The foregoing discussion discloses and describes merely exemplary embodiments of the present invention. One skilled in the art will readily recognize from such discussion and from the accompanying drawings that various changes, modifications and variations can be made therein without departing from the spirit and scope of the invention.

What is claimed is:

1. A self power engine system for on-demand power generation to energize the attached circuits, receiving alternating electric energy from a generator through a first electrode, further the self-power engine system comprising:
   a second electrode coupled to the first electrode of the generator for receiving the alternating electric energy generated from the generator;
   at least one bridge rectifier to convert the received alternating electric energy to the direct electric energy;
   plurality of buffers to store the converted direct electric energy for energizing the attached electronic circuitry;
   one or more clock unit synchronized with the alternating electric energy received by the second electrode to provide the switching sequence by generating the clock signals;
   a state machine connected to the buffers to provide switching between the buffers either in series or in parallel and further the state machine received the switching sequences from the one or more clock unit; and
   a computing unit connected to the state machine to compute the energy requirement of the attached circuits and further transmits the computed data to the state machine for energizing the attached circuits.

2. The self power engine system according to claim 1 wherein the computing unit stores instructions to alter the functions and the output values of the state machine.

3. The self power engine system according to claim 1 further comprising a light emitting diode attached to the computing unit for emitting lights.

4. The self power engine system according to claim 1 configured into an electronic integrated circuit.

5. The self power engine system according to claim 1 further comprising a power management to provide regulated voltage of varied polarity to attached circuits.

6. The self power engine system according to claim 1 wherein the coupling in between the first electrode and the second electrode is at least one of:
   over the air;
   conductive medium; and
   non-conductive medium.

7. The self power engine system according to claim 1 further comprising a switch matrix connected to the buffers either in series or in parallel and further the switch matrix receives the direct electric energy under control of the state machine sequences.

8. The self power engine system according to claim 1 wherein the state machine further monitors the energy level of the buffers.

* * * * *